US007793416B2

(12) United States Patent
Vogel

(10) Patent No.: US 7,793,416 B2
(45) Date of Patent: Sep. 14, 2010

(54) METHODS FOR HARDENING PUMP CASINGS

(75) Inventor: William Vogel, Hudson, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 1157 days.

(21) Appl. No.: 11/383,241

(22) Filed: May 15, 2006

(65) Prior Publication Data

US 2007/0261237 A1 Nov. 15, 2007

(51) Int. Cl.

*B23P 15/00* (2006.01)
*B23P 17/00* (2006.01)
*C22C 5/02* (2006.01)
*C22C 38/00* (2006.01)

(52) U.S. Cl. ................. 29/888.02; 29/888; 29/888.025; 148/328; 148/405

(58) Field of Classification Search .................. 29/888, 29/888.02, 888.025; 148/326, 328, 405, 148/542
See application file for complete search history.

(56) References Cited

U.S. PATENT DOCUMENTS 1,419,717 A * 6/1922 Cary et al. .................... 451/89
3,011,873 A * 12/1961 Davis ......................... 436/149
3,341,372 A * 9/1967 Sadowski ................... 148/621
3,871,928 A * 3/1975 Smith et al. ................. 148/607
4,637,782 A 1/1987 Teubler et al.
4,738,730 A 4/1988 Ferguson
5,254,181 A 10/1993 Yoshino et al.
5,261,976 A * 11/1993 Schultz ....................... 148/508
5,320,686 A 6/1994 Johansson et al.
5,427,631 A 6/1995 Johansson et al.
5,431,552 A 7/1995 Schuller et al.
5,503,687 A 4/1996 Berns
5,599,404 A 2/1997 Alger
6,090,223 A 7/2000 Kiuchi et al.
6,117,249 A 9/2000 Erikson et al.
6,314,642 B1 11/2001 Thompson et al.
6,547,888 B1 4/2003 Williams et al.
6,755,924 B2 * 6/2004 Harrison et al. ............. 148/675
2004/0197581 A1 10/2004 Berglund
2006/0048861 A1 3/2006 Watanabe et al.

* cited by examiner

*Primary Examiner*—David P Bryant
*Assistant Examiner*—Alexander P Taousakis
(74) *Attorney, Agent, or Firm*—Miller, Matthias & Hull

(57) ABSTRACT

A method for manufacturing a hardened casing for a vane pump is disclosed. The method includes providing a vane pump casing; hardening the casing by (i) cleaning the casing with a high pressure fluid containing abrasive material, (ii) loading the casing in a furnace, (iii) purging the furnace with an inert gas followed by purging the furnace with ammonia, (iv) conducting a first heating of the casing in the furnace at a first temperature of about 1200° F. for a time period of about 4 hours, (v) conducting a second heating of the casing in the furnace at a second temperature of about 1000° F. for a time period of about 4 hours, and (vi) cooling the casing and purging the furnace with an inert gas before removing the casing.

18 Claims, 2 Drawing Sheets

METHODS FOR HARDENING PUMP CASINGS

BACKGROUND

1. Technical Field

Disclosed are methods for hardening pump casings and, more specifically, methods for hardening vane pump casings The disclosed methods are particularly useful for the design and manufacture of stainless steel rotary vane pumps Wear of vane pump casings is reduced resulting in less material being removed from the casing and less material being embedded into the vanes and/or causing premature weal of the vanes 2. Description of the Related Art Vane pumps are used successfully in a wide variety of applications and industries. Because of vane strength and the absence of metal-to-metal contact, vane pumps are ideally suited for low-viscosity, nonlubricating liquids up to 2,200 cSt/10,000 SSU. Such liquids include LPG, ammonia, solvents, alcohol, fuel oils, gasoline, and refrigerants. Vane pumps are available in a number of vane configurations including sliding vanes, flexible vanes, swinging vanes, rolling vanes, and external vanes. Vane pumps are noted for their reliability, dry priming, easy maintenance, and good suction characteristics. Moreover, the vanes can usually handle fluid temperatures ranging from −32° C. (−25° F.) to 260° C. (500° F.) and pressures up to 30 BAR (400 PSI).

Each type of vane pump offers unique advantages For example, external vane pumps can handle large solids. Flexible vane pumps, on the other hand, can only handle small solids but create good vacuum Sliding vane pumps can run dry for short periods of time and handle small amounts of vapor.

As shown in FIGS. 1-3, a vane pump 10 typically includes a slotted rotor 11 eccentrically supported within a cycloidal chamber 12 of a casing 13. The rotor 11 is located close to the wall of the casing so a crescent-shaped cavity 14 is formed. The rotor 11 is sealed in the chamber by two side discs (not shown in FIGS. 1-3). Vanes 15 fit within the slots of the rotor 11. As the rotor 11 rotates and fluid enters the pump 10, centrifugal force, hydraulic pressure, and/or pushrods push the vanes 15 to the walls of the casing 13 Fluid enters the pockets created by the vanes 15, rotor 11, casing 13, and discs. As the rotor 11 continues to rotate, the vanes 15 sweep the fluid to the opposite side of the crescent cavity 14 where it is squeezed through discharge holes 16 of the casing to the discharge port 17.

On problem associated with vane pumps having steel casings is casing weal Specifically, contact between the vanes and the casing wall results in removal of material from the casing wall, which enters the fluid flow, can become embedded in the vanes and/or cause premature vane wear Also, fluid contamination caused by casing material can be problematic as well. Therefore, development of improved casings for vane pumps is needed, including improvements in steel casings, more specifically, stainless steel casings and still more specifically, austenitic stainless steel casings.

SUMMARY OF THE DISCLOSURE

In satisfaction of the aforenoted needs, a method for manufacturing a pump such as a vane pump is disclosed, which comprises:

providing a cleaned casing;

hardening the casing by loading the casing in a furnace, purging the furnace with ammonia, conducting a first heating of the casing in the furnace at a first temperature ranging from about 1100 to about 1500° F. for a time period ranging from about 3 to about 5 hours, conducting a second heating of the casing in the furnace at a second temperature ranging from about 800 to about 1200° F. for a time period ranging from about 3 to about 5 hours; and assembling the pump with said casing.

In a refinement, the furnace is purged with an inert gas before it is purged with ammonia.

In another refinement, the furnace is purged with an inert gas as the casing is cooled after the second heating.

In a refinement, the casing is a steel casing, preferably a stainless steel casing, still more preferably an austenitic stainless steel casing.

In a refinement, the casing is cleaned by sand blasting or spraying a high pressure fluid on the casing wherein the fluid includes abrasive particles entrained therein.

In a refinement, the casing is loaded into the furnace with at least one other casing and the casings are spaced apart from each other and do not engage each other.

In a refinement, the first heating is called out a temperature ranging from about 1200 to about 1400° F. for a time period ranging from about 3 to about 5 hours.

In a refinement, the first heating is carried out a temperature ranging from about 1200 to about 1400° F. for a time period ranging from about 3.5 to about 4.5 hours.

In a refinement, the first heating is carried out a temperature of about 1300° F. for a time period of about 4 hours.

In a refinement, the second heating is carried out a temperature ranging from about 900 to about 1100° F. for a time period ranging from about 3 to about 5 hours In a refinement, the second heating is carried out a temperature ranging from about 900 to about 1100° F. for a time period ranging from about 3.5 to about 4.5 hours In a refinements the second heating is carried out a temperature of about 1000° F. for a time period of about 4 hours.

In a refinement, at least one of the first and second inert gases comprise nitrogen A vane pump comprising a casing made from the above methods is also disclosed.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
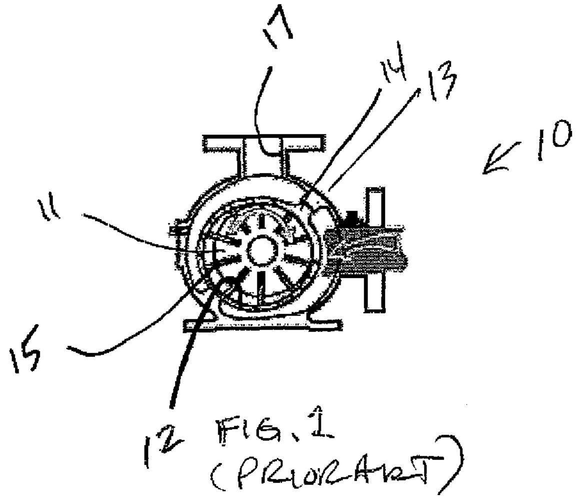
FIG. 1 (PRIOR ART)
FIG. 1 is a side sectional view of a conventional vane pump used for purposes of illustration.
Figure 2:
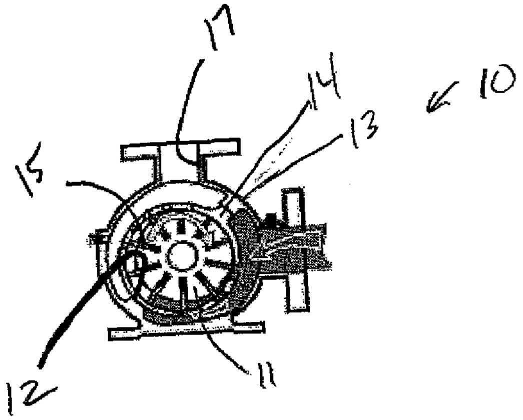
FIG. 2 (PRIOR ART)
FIG. 2 is another side sectional view of the vane pump shown in FIG. 1, illustrating the flow of fluid from the inlet into the crescent-shaped chamber.
Figure 3:
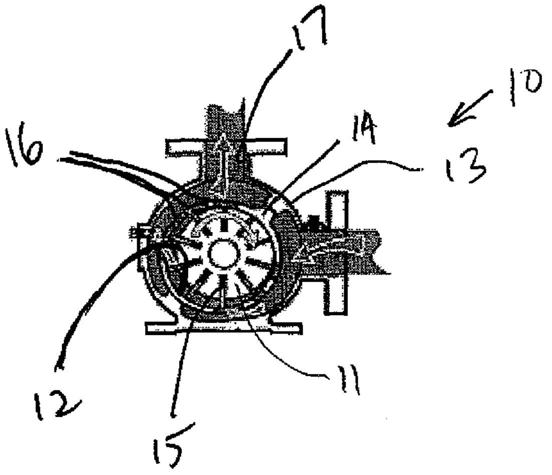
FIG. 3 (PRIOR ART)
FIG. 3 is another side sectional view of the vane pump shown in FIG. 1, further illustrating the flow of fluid through the crescent-shaped chamber to the outlet port.
Figure 4:
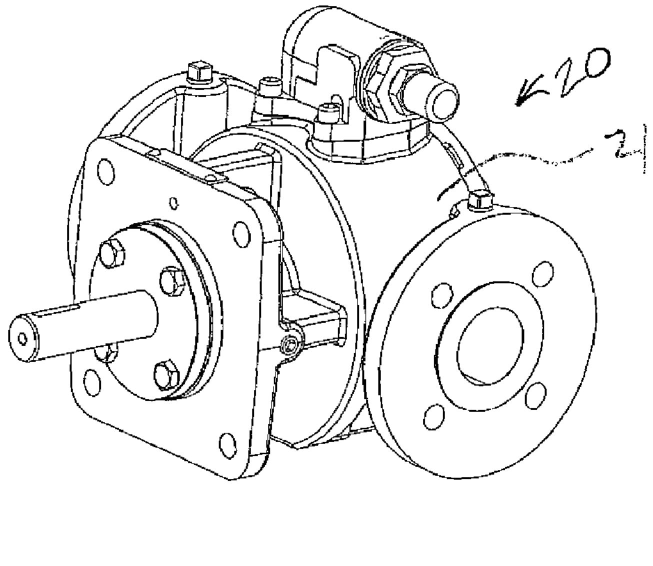
FIG. 4 is a perspective view of a vane pump made in accordance with this disclosure.
Figure 5:
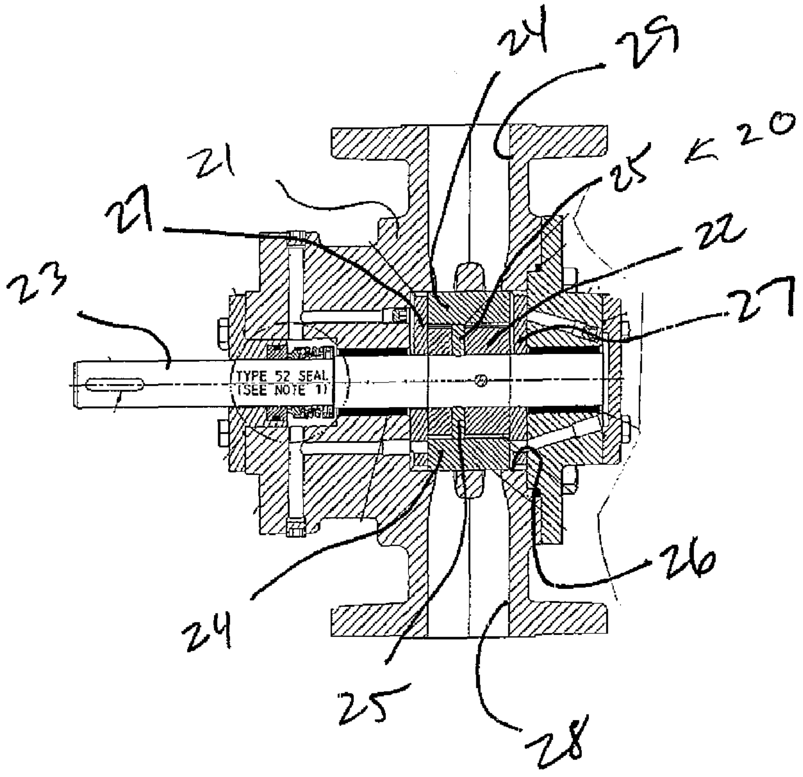
FIG. 5 is a top sectional view of the pump shown in FIG. 4

Turning now to FIGS. 4 and 5, a vane pump 20 made in accordance with this disclosure is shown. The pump 20 includes a casing 21 that may be fabricated from stainless steel, preferably an austenitic stainless steel. The rotor 22 is mounted to a drive shaft 23. Slots are disposed in the rotor 22 which accommodate a plurality of vanes, two of which are shown at 24. The vanes 24 are connected to pushrods 25 and extend radially outwardly as the rotor 22 and drive shaft 23 rotate. And elliptical chamber is formed between the wall 26 of the casing 21, the two discs 27, and the outer periphery of the rotor 22. The vanes 24 extend outwardly as the shaft 23 and rotor 20 to rotate to accelerate movement of fluid between the inlet 28 in the outlet 29. Essentially, the pump 20 of FIGS. 4 and 5 operates in a manner similar or analogous to that of the pump illustrated in FIGS. 1-3.

To eliminate or reduce problems associated with wear of the casing wall 26 as caused by engagement of the wall 26 by the vanes 24, methods of hardening the stainless steel casing 21 are disclosed here. Excessive wear of the casing 21, and in particular, the wall 26 of the casing 21 causes stainless steel particles to be embedded in the vanes 24, in the slots disposed in the rotor 22 that accommodate the vanes 24 or in the slots disposed in the rotor 22 that accommodate the pushrods 25. Further, stainless steel particles entrained in the fluid to being pumped can also be problematic.

Therefore, to reduce wear of the casing 21, methods of hardening the casing 21 or stainless steel pump casings in general such as austenitic stainless steel pump casings are disclosed below.

Surface Preparation

An initial step in the hardening process is nitriding the part However, prior to nitriding, the parts must be thoroughly cleaned to remove dirt, film, and chromium or chromic oxide. Typically, a film of chromic oxide forms on stainless steel when it is exposed to air. This film retards the nitride process and must be removed no sooner than four hours before nitriding. Therefore, the parts to be hardened are preferably cleaned the prior to nitriding but not the day before.

Preferably, the parts are cleaned by sand blasting. Of course, other means for cleaning stainless steel parts such as pump casings are known and will be apparent to those skilled in the art. Sandblasting is just one preferred method but other methods such as chemical or mechanical methods can be used.

After the parts are cleaned, the part should be handled as little as possible and, when handled, clean gloves should be utilized. Further, when the parts are loaded into the furnace, they should be spaced-apart so that adjacent parts are not in contact with one another Contact between parts during the heating/nitriding can cause damage to the exterior surfaces of the parts. The use of baskets and screens to separate parts is advised.

Nitrogen Purge

After the parts are loaded into the furnace, the furnace is purged with nitrogen. The nitrogen purge is performed primarily for safety reasons, specifically to remove air from the furnace Mixtures of 15% to 26% ammonia in air are explosive if ignited by a spark.

Ammonia Purge

After the nitrogen purge, the furnace is purged with ammonia. After the ammonia purge, the heating sequence is performed.

Heating Sequence

First Cycle: Two separate heating cycles are performed in the ammonia atmosphere. The first heat cycle is performed at a higher temperature than the second heat cycle. The two cycles are preferably performed sequentially. The first heat cycle can be performed at temperatures ranging from an excess of 1000° F. to about 1500° F., more preferably from about 1200° F. to about 1400° F., still mole preferably at a temperature of about 1300° F. For the first heat cycle can range from about three to about five hours, and mote preferably for about four hours In a preferred embodiment, the first heat cycle is carried out at a constant or near-constant temperature of about 1300° F. for a time period of about four hours.

Second Cycle: The second heat cycle is preferably carried out immediately after the first heat cycle. As the second heat cycle is performed at a lower temperature, the heat of the furnace can simply be reduced to the preferred temperature. A preferred temperature range for the second heat cycle is from about 800° F. to about 1200° F., more preferably from about 900° F. to about 1100° F., still more preferably about 1000° F. Similar to the first heat cycle, the second heat cycle can range from about three to about five hours, and more preferably for about four hours.

Thus, a preferred embodiment includes a first heat cycle at about 1300° F. for about four hours followed immediately by a second heat cycle at a reduced temperature of about 1000° F. for time period of about four hours.

Cool Down and Unload

After the two heat cycles are performed, the heat supply to the furnace is reduced or turned off in the parts ate cooled under a nitrogen purge. The parts are then unloaded from the furnace.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method for manufacturing a pump, the method comprising:

providing a cleaned casing;
hardening the casing by
loading the casing in a furnace,
purging the furnace with a first inert gas,
purging the furnace with ammonia,
conducting a first heating of the casing in the furnace at a first temperature ranging from about 1100 to about 1500° F. for a time period ranging from about 3 to about 5 hours,
conducting a second heating of the casing in the furnace at a second temperature ranging from about 800 to about 1200° F. for a time period ranging from about 3 to about 5 hours,
purging the furnace with a second inert gas,
cooling the casing and purging the furnace with a second inert gas; and
assembling the pump with said casing.

2. The method of claim 1 wherein the casing is cleaned by sand blasting.

3. The method of claim 1 wherein the casing is loaded into the furnace with at least one other casing and the casings are spaced apart from each other and do not engage each other.

4. The method of claim 1 wherein the first heating is carried out a temperature ranging from about 1200 to about 1400° F. for a time period ranging from about 3 to about 5 hours.

5. The method of claim 1 wherein the first heating is carried out a temperature ranging from about 1200 to about 1400° F. for a time period ranging from about 3.5 to about 4.5 hours.

6. The method of claim 1 wherein the first heating is carried out a temperature of about 1300° F. for a time period of about 4 hours.

7. The method of claim 1 wherein the second heating is carried out a temperature ranging from about 900 to about 1100° F. for a time period ranging from about 3 to about 5 hours.

8. The method of claim 1 wherein the second heating is carried out a temperature ranging from about 900 to about 1100° F. for a time period ranging from about 3.5 to about 4.5 hours.

9. The method of claim 1 wherein the second heating is carried out a temperature of about 1000° F. for a time period of about 4 hours.

10. The method of claim 1 wherein the first and second inert gases comprise nitrogen.

11. A method for manufacturing a casing for a vane pump, the method comprising:
- providing a casing;
- hardening the casing by
  - cleaning the casing,
  - loading the casing in a furnace,
  - purging the furnace with an inert gas,
  - purging the furnace with ammonia,
  - conducting a first heating of the casing in the furnace at a first temperature ranging from about 1100 to about 1500° F. for a time period ranging from about 3 to about 5 hours,
  - conducting a second heating of the casing in the furnace at a second temperature that is less than the first temperature and which ranges from about 800 to about 1200° F. for a time period ranging from about 3 to about 5 hours, and
  - cooling the casing and purging the furnace with an inert gas.

12. The method of claim 11 wherein the casing is cleaned by applying a high pressure fluid stream containing abrasive particles.

13. The method of claim 11 wherein the casing is loaded into the furnace with at least one other casing and the casings are spaced apart from each other and do not engage each other.

14. The method of claim 11 wherein the first heating is carried out a temperature ranging from about 1200 to about 1400° F. for a time period ranging from about 3 to about 5 hours.

15. The method of claim 11 wherein the first heating is carried out a temperature ranging from about 1200 to about 1400° F. for a time period ranging from about 3.5 to about 4.5 hours.

16. The method of claim 11 wherein the second heating is carried out a temperature ranging from about 900 to about 1100° F. for a time period ranging from about 3 to about 5 hours.

17. The method of claim 11 wherein the second heating is carried out a temperature ranging from about 900 to about 1100° F. for a time period ranging from about 3.5 to about 4.5 hours.

18. A method for manufacturing a casing for a vane pump, the method comprising:
- providing a vane pump casing;
- hardening the casing by
  - cleaning the casing with a high pressure fluid containing abrasive material,
  - loading the casing in a furnace,
  - purging the furnace with nitrogen followed by purging the furnace with ammonia,
  - conducting a first heating of the casing in the furnace at a first temperature of about 1200° F. for a time period of about 4 hours,
  - conducting a second heating of the casing in the furnace at a second temperature of about 1000° F. for a time period of about 4 hours, and
  - cooling the casing and purging the furnace with nitrogen before removing the casing.

* * * * *